(12) United States Patent
Aso

(10) Patent No.: US 8,927,164 B2
(45) Date of Patent: Jan. 6, 2015

(54) FUEL CELL SYSTEM WITH SCAVENGING MEANS AND CONTROL UNIT THEREOF

(75) Inventor: Shinji Aso, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 381 days.

(21) Appl. No.: 12/741,914

(22) PCT Filed: Oct. 16, 2008

(86) PCT No.: PCT/JP2008/068770
§ 371 (c)(1),
(2), (4) Date: May 7, 2010

(87) PCT Pub. No.: WO2009/060703
PCT Pub. Date: May 14, 2009

(65) Prior Publication Data
US 2010/0266911 A1    Oct. 21, 2010

(30) Foreign Application Priority Data
Nov. 8, 2007    (JP) .................................. 2007-290945

(51) Int. Cl.
*H01M 8/04* (2006.01)
*H01M 16/00* (2006.01)
*H01M 8/10* (2006.01)

(52) U.S. Cl.
CPC ...... *H01M 8/04179* (2013.01); *H01M 8/04223* (2013.01); *H01M 8/04388* (2013.01); *H01M 8/04559* (2013.01); *H01M 8/04589* (2013.01); *H01M 16/006* (2013.01); H01M 2008/1095 (2013.01); Y02E 60/50 (2013.01)

USPC .......... 429/429; 429/414; 429/428; 429/444; 429/450

(58) Field of Classification Search
USPC .......... 429/414, 428, 429, 444, 450; 180/65.3
See application file for complete search history.

(56) References Cited

U.S. PATENT DOCUMENTS

| | | | |
|---|---|---|---|
| 2003/0150655 A1* | 8/2003 | Itou | 180/65.3 |
| 2004/0062963 A1* | 4/2004 | Umayahara et al. | 429/22 |
| 2006/0159966 A1* | 7/2006 | Wake et al. | 429/13 |
| 2007/0111058 A1* | 5/2007 | Yoshida | 429/22 |

FOREIGN PATENT DOCUMENTS

| | | |
|---|---|---|
| JP | 2000-315516 A | 11/2000 |
| JP | 2005-190824 A | 7/2005 |
| JP | 2007-115581 A | 5/2007 |
| JP | 2007-141812 A | 6/2007 |
| JP | 2007-157621 A | 6/2007 |
| JP | 2008-108434 A | 5/2008 |

* cited by examiner

*Primary Examiner* — Zachary Best
(74) *Attorney, Agent, or Firm* — Kenyon & Kenyon LLP

(57) ABSTRACT

Even in a fuel cell system which performs scavenging processing after the power generation of a fuel cell is stopped, the operation time for when a battery is being operated can be increased. When determining that the condition of running out of gas occurs based on a sensor value of a pressure sensor, a control unit stops the power generation of the fuel cell. The control unit, for example, shortens the time required for scavenging processing and then performs the scavenging processing. On the other hand, when determining that the condition of running out of gas does not occur and when the power generation of the fuel cell should be stopped, the control unit stops the power generation and then performs normal scavenging processing.

4 Claims, 2 Drawing Sheets

FUEL CELL SYSTEM WITH SCAVENGING MEANS AND CONTROL UNIT THEREOF

This is a 371 national phase application of PCT/JP2008/068770 filed 16 Oct. 2008, which claims priority to Japanese Patent Application No. 2007-290945 filed 8 Nov. 2007, the contents of which are incorporated herein by reference.

FIELD OF THE INVENTION

The invention relates to a fuel cell system.

BACKGROUND OF THE INVENTION

In general, a fuel cell (e.g., a solid polymer electrolyte fuel cell) is configured by laminating a plurality of cells in each of which an electrolyte is sandwiched by separators. In such a fuel cell, if produced water or condensed water remains in a flow path, etc. in the separators, such water will freeze at a low temperature, which might cause, in some cases, electrolyte membranes, separators, pipes, valves, etc. to be broken. Furthermore, if frozen water blocks a gas flow path, the supply of gas will be hindered when the fuel cell is started next time, which might hinder an electrochemical reaction from progressing sufficiently. In light of such circumstances, in related art fuel cell systems, so-called scavenging processing for removing water remaining in a fuel cell is performed by, for example, sending dry air into the fuel cell when, for example, the operation is ended (for example, see patent document 1).

Patent document 1: Japanese laid-open patent publication No. 2007-157621

DISCLOSURE OF THE INVENTION

Problem to be Solved by the Invention

Scavenging processing is performed utilizing electrical power stored in a secondary cell (battery) after power generation of a fuel cell is stopped. Accordingly, if the scavenging processing is performed after the power generation of the fuel cell is stopped due to the occurrence of running out of gas, the amount of remaining power in the secondary cell will be reduced, which will shorten a travel distance by an EV (Electric Vehicle) driving during the operation of the battery.

The present invention has been made in order to solve the above problem in the related art, and an object of the present invention is to provide a fuel cell system capable of increasing operation time for when a battery is being operated even in a fuel cell system which performs scavenging processing after power generation of a fuel cell is stopped.

Means for Solving the Problem

In order to solve the problem above, provided according to the present invention is a fuel cell system having a fuel cell which is supplied with a fuel gas and an oxidant gas and which generates electrical power through an electrochemical reaction between the fuel gas and the oxidant gas, the fuel cell system comprising: a power storage unit which can be charged with electric power generated by the fuel cell; a scavenging processing execution means which executes scavenging processing for removing remaining water in the fuel cell using the electrical power stored in the power storage unit after power generation of the fuel cell is stopped; and a judgment means which judges whether or not an abnormal condition occurs in the fuel cell system, wherein the scavenging processing execution means limits the execution of the scavenging processing when the judgment means determines that the abnormal condition occurs.

According to the present invention, when the power generation of the fuel cell is stopped as a result of the occurrence of an abnormal condition in the fuel cell system, the execution of the scavenging processing can be limited, thereby suppressing a decrease in electrical power stored in the power storage unit (battery).

In the fuel cell system above, the abnormal condition may be the condition of running out of gas.

With such a configuration, when the power generation of the fuel cell is stopped as a result of the occurrence of running out of gas, the execution of the scavenging processing can be limited, thereby suppressing a decrease in the electrical power stored in the power storage unit.

In the fuel cell system above, the scavenging processing execution means can limit the execution of the scavenging processing by shortening the time required for the scavenging processing. With such a configuration, electrical power stored in the power storage unit can be saved.

In the fuel cell system above, the scavenging processing execution means can limit the execution of the scavenging processing by prohibiting the execution of the scavenging processing. With such a configuration, the operation of the fuel cell can be ended without using electrical power stored in the power storage unit.

The fuel cell system above further comprises a compressor which supplies the oxidant gas to the fuel cell, wherein the scavenging processing execution means executes the scavenging processing by supplying the oxidant gas from the compressor to the fuel cell, while limiting the execution of the scavenging processing by reducing an amount of supply of the oxidant gas supplied from the compressor. With such a configuration, the electrical power stored in the power storage unit can be saved.

Effect of the Invention

In the present invention, even in a fuel cell system which performs the scavenging processing after the power generation of the fuel cell is stopped, the operation time for when the battery is being operated can be increased.

DESCRIPTION OF REFERENCE NUMERALS

1: fuel cell system, 2: fuel cell, 3: oxidant gas pipe system, 4: hydrogen gas pipe system, 5: power system, 6: control unit, 30: filter, 31: compressor, 32: air supply flow path, 33: air discharge flow path, 34: humidifier, 40: hydrogen tank, 41: hydrogen supply flow path, 42: circulation flow path, 43: main stop valve, 44: regulator, 45: hydrogen pump, 46: gas-liquid separator, 47: exhaust/drain valve, 48: discharge flow path, 49: diluter, 51: DC/DC converter, 52: secondary cell, 53: traction inverter, 54: traction motor, P: pressure sensor, A: current sensor, V: voltage sensor

BEST MODE FOR CARRYING OUT THE INVENTION

A preferred embodiment of a fuel cell system according to the present invention will be described below with reference to the attached drawings. The following description describes an embodiment in which the fuel cell system according to the present invention is used as an in-vehicle power generation system in a fuel cell hybrid vehicle (FCHV).

The fuel cell system in the present embodiment is a fuel cell system which performs scavenging processing after power generation of a fuel cell is stopped, wherein a decrease in electrical power stored in a battery is suppressed by limiting the execution of scavenging processing when the power generation of the fuel cell is stopped due to an abnormal condition such as running out of gas. The configuration and operation of the fuel cell system having the feature above will be described below.

Figure 1:
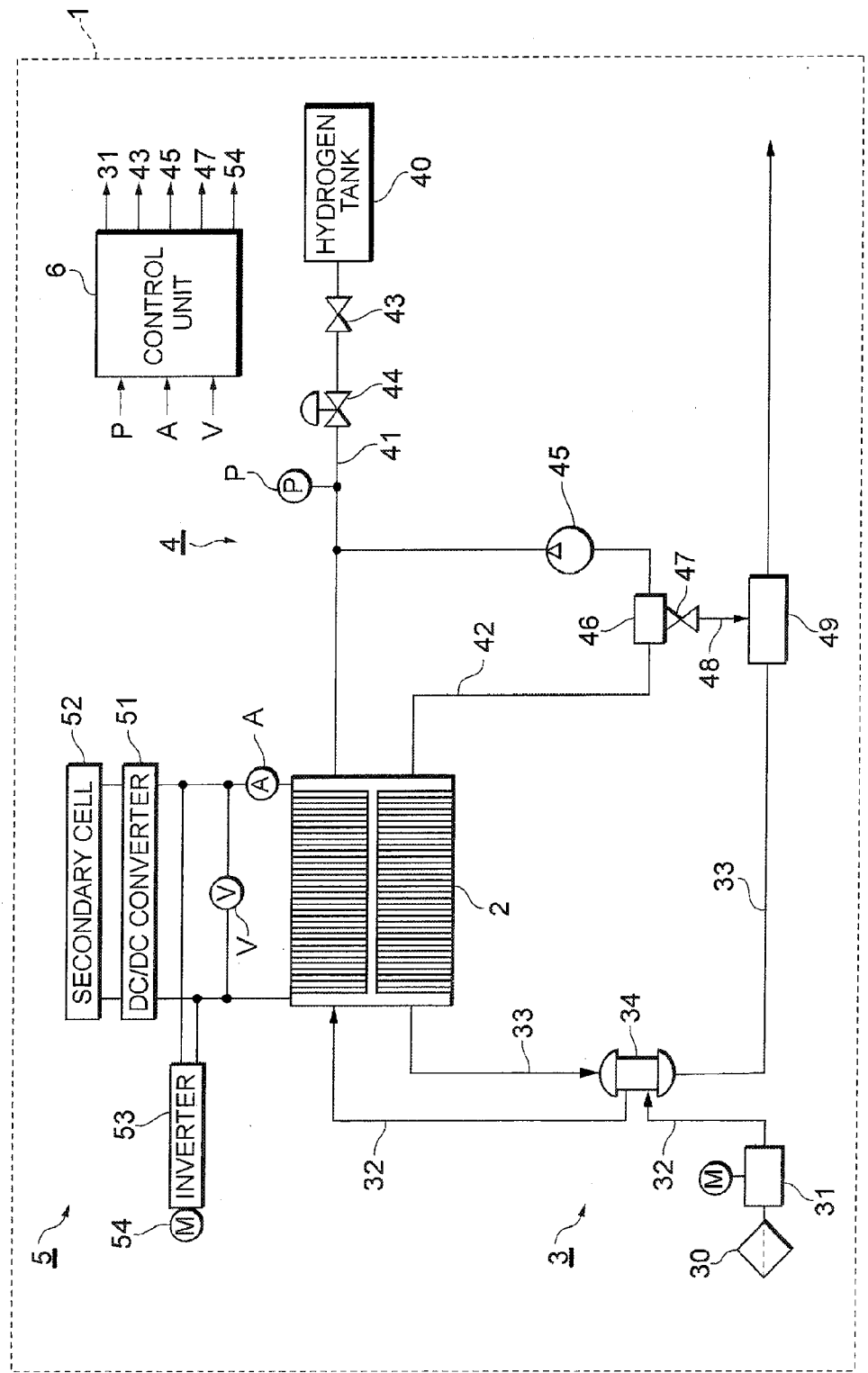
FIG. 1 is a configuration diagram schematically showing a fuel cell system in an embodiment.

With reference to FIG. 1, the configuration of the fuel cell system according to the present embodiment will be described. FIG. 1 is a configuration diagram schematically showing the fuel cell system in the present embodiment.

As shown in FIG. 1, the fuel cell system 1 includes: a fuel cell 2 which generates electrical power through an electrochemical reaction between oxidant gas and fuel gas serving as reactant gasses; an oxidant gas pipe system 3 which supplies the air serving as the oxidant gas to the fuel cell 2; a hydrogen gas pipe system 4 which supplies hydrogen serving as the fuel gas to the fuel cell 2; a power system 5 which allows charge and discharge of the electrical power of the system; and a control unit 6 which centrally controls the entire system. The fuel cell 2 and the hydrogen gas pipe system 4 constitute a hydrogen gas supply mechanism.

The fuel cell 2 is, for example, a polymer electrolyte type, which has a stack structure with a lot of unit cells stacked therein. Each unit cell has an air electrode on one surface of an electrolyte constituted from an ion-exchange membrane and a fuel electrode on the other surface of the electrolyte, and the unit cell further has a pair of separators which sandwich the air electrode and the fuel electrode therebetween. In this configuration, the hydrogen gas is supplied to a hydrogen gas flow path of one separator while the oxidant gas is supplied to an oxidant gas flow path of the other separator, and electrical power is generated through a chemical reaction between these reactant gasses. The fuel cell 2 is provided with a current sensor A which detects an output current of the fuel cell 2 and a voltage sensor V which detects an output voltage of the fuel cell 2.

The oxidant gas pipe system 3 includes: a compressor 31 which compresses the air introduced via a filter 30 and sends out the compressed air as the oxidant gas; an air supply flow path 32 for supplying the oxidant gas to the fuel cell 2; and an air discharge flow path 33 for discharging an oxidant-off gas discharged from the fuel cell 2. The air supply flow path 32 and the air discharge flow path 33 are provided with a humidifier 34 which humidifies the oxidant gas compressed and sent by the compressor 31 using the oxidant-off gas discharged from the fuel cell 2. After being subjected to moisture exchange in the humidifier 34, the oxidant-off gas is finally exhausted to the atmosphere outside the system as exhaust gas.

The hydrogen gas pipe system 4 includes: a hydrogen tank 40 serving as a fuel supply source which stores hydrogen gas having a high pressure (e.g., 70 MPa); a hydrogen supply flow path 41 serving as a fuel supply flow path for supplying the hydrogen gas in the hydrogen tank 40 to the fuel cell 2; and a circulation flow path 42 for returning a hydrogen-off gas discharged from the fuel cell 2 to the hydrogen supply flow path 41. Note that the hydrogen tank 40 is an embodiment of the fuel supply source in the present invention. Although the hydrogen tank 40 is used as the fuel supply source in the present embodiment, the hydrogen tank 40 may be replaced with, for example, a modifier which modifies a hydrocarbon fuel to a hydrogen-enriched fuel gas using water vapor and a high-pressure gas tank which stores the fuel gas modified by the modifier in a high-pressure state. Also, a tank having a hydrogen-absorbing alloy can be used as the fuel supply source.

The hydrogen supply flow path 41 is provided with: a main stop valve 43 which shuts off or allows the supply of hydrogen gas from the hydrogen tank 40; and a regulator 44 which regulates the pressure of the hydrogen gas to a preset secondary pressure. Also, a pressure sensor P which detects the pressure of hydrogen gas in the hydrogen gas supply mechanism is provided on the downstream of the regulator 44.

The circulation flow path 42 is provided with a hydrogen pump 45 which compresses the hydrogen-off gas in the circulation flow path 42 and sends the compressed hydrogen-off gas toward the hydrogen supply flow path 41. The circulation flow path 42 is connected to a discharge flow path 48 via a gas-liquid separator 46 and an exhaust/drain valve 47. The gas-liquid separator 46 collects moisture from the hydrogen-off gas. The exhaust/drain valve 47 purges the moisture collected by the gas-liquid separator 46 and the hydrogen-off gas containing impurities in the circulation flow path 42 in accordance with a command from the control unit 6. The hydrogen-off gas discharged from the exhaust/drain valve 47 is diluted by a diluter 49 and merges with the oxidant-off gas in the air discharge flow path 33.

The power system 5 includes a DC/DC converter 51, a secondary cell (power storage unit) 52 serving as a battery, a traction inverter 53, a traction motor 54 and various auxiliary inverters (not shown). The DC/DC converter 51 is a direct-current voltage converter, which has: a function of regulating a direct-current voltage input from the secondary cell 52 and outputting the regulated voltage to the traction inverter 53; and a function of regulating a direct-current voltage input from the fuel cell 2 or the traction motor 54 and outputting the regulated voltage to the secondary cell 52. Due to these functions of the DC/DC converter 51, the secondary cell 52 can be charged or discharged. Also, the DC/DC converter 51 controls an output voltage of the fuel cell 2.

The secondary cell 52 includes stacked battery cells and provides a certain high voltage as a terminal voltage, the secondary cell 52 being capable of being charged with surplus electrical power and supplying electrical power in an auxiliary manner under the control of a battery computer (not shown). The secondary cell 52 is provided with a remaining capacity monitor (not shown) for detecting the remaining capacity of the secondary cell 52. As the remaining capacity monitor, for example, an SOC meter which integrates a current value in charge or discharge in the secondary cell 52 with time or a voltage sensor may be employed.

The traction inverter 53 converts a direct current to a three-phase alternating current, and supplies the three-phase alternating current to the traction motor 54. The traction motor 54 is, for example, a three-phase alternating current motor, which serves as a main power source for, for example, a fuel cell hybrid vehicle equipped with the fuel cell system 1.

The auxiliary inverters are electric motor control units which control the drive of respective motors, and the auxiliary inverters convert a direct current to a three-phase alternating current and supply the three-phase alternating current to the respective motors. The auxiliary inverters are, for example, pulse width modulation-type (PMW) inverters, which convert a direct-current voltage output from the fuel cell 2 or the secondary cell 52 to a three-phase alternating current voltage in accordance with a control command from the control unit 6 and control rotary torques generated in the respective motors.

The control unit 6 detects the amount of operation of an acceleration member (an accelerator, etc.) provided in a fuel cell hybrid vehicle, receives control information such as an acceleration request value (e.g., the amount of power generation required by power-consuming apparatuses such as the traction motor 54), and controls the operation of various appliances in the system. Examples of the power-consuming apparatuses may include, in addition to the traction motor 54, auxiliary apparatuses required for operating the fuel cell 2 (e.g., motors for the compressor 31 and the hydrogen pump 45, etc.); actuators used in various apparatuses relevant to the travel of the vehicle (e.g., a speed change gear, a wheel control apparatus, a steering gear and a suspension); and an air-conditioning apparatus (air conditioner), lighting equipment, audio system, etc. which are provided in a passenger compartment.

The control unit (judgment means) 6 judges whether or not a sensor value of the pressure sensor P is equal to or smaller than a running-out-of-gas determination threshold value. The running-out-of-gas determination threshold value is the value of residual pressure of hydrogen gas, which is used for determining that the condition of running out of gas occurs. Accordingly, if the sensor value of the pressure sensor P is equal to or smaller than the running-out-of-gas determination threshold value, the control unit 6 determines that the condition of running out of gas occurs, provides an indication indicating the occurrence of running out of gas and stops the power generation of the fuel cell 2. Note that the method of determining that the condition of running out of gas occurs is not limited to one using a sensor value of the pressure sensor P. For example, the determination that the condition of running out of gas occurs may be made using the integrated amount of used hydrogen gas, the weight of the hydrogen tank, the remaining amount of hydrogen gas calculated from a pressure and a temperature, etc.

The control unit (scavenging processing execution means) 6 performs the scavenging processing using electrical power stored in the secondary cell 52 after the power generation of the fuel cell 2 is stopped. The scavenging processing herein refers to the processing of discharging water in the fuel cell 2 to the outside of the fuel cell 2 when the power generation of the fuel cell 2 is stopped, i.e., removing remaining water in the fuel cell 2. Various processing methods may be employed as the scavenging processing. For example, the scavenging processing may be performed by supplying the oxidant gas from the compressor 31 to the air supply flow path 32 with the supply of hydrogen gas to the fuel cell 2 being stopped. In such a configuration, since water including produced water which remains in the air supply flow path 32 is discharged to the air discharge flow path 33 by the supplied oxidant gas, the remaining water in the fuel cell 2 is removed.

When determining that the condition of running out of gas occurs, the control unit 6 limits the execution of the scavenging processing above. Examples of the content of limitation include shortening the time required for the scavenging processing, prohibiting the execution of the scavenging processing, and reducing the amount of supply of the oxidant gas in the scavenging processing. Shortening the time required for the scavenging processing or reducing the amount of supply of the oxidant gas in the scavenging processing enables the electrical power stored in the secondary cell 52 to be saved. Prohibiting the execution of the scavenging processing enables the operation of the fuel cell 2 to be ended without using the electrical power stored in the secondary cell 52. Accordingly, consumption of electrical power in the secondary cell 52 associated with the execution of the scavenging processing can be suppressed, and therefore a travel distance by an EV drive can be increased even in the fuel cell system 1 which performs scavenging processing after the power generation of the fuel cell 2 is stopped.

The control unit 6 physically has, for example, a CPU, a ROM or an HDD which stores a control program and control data used in the CPU, a RAM used as various work areas mainly for control processing, and input-output interfaces. These components are connected to each other via a bus. The input and output interfaces are connected to various sensors such as the pressure sensor P, the current sensor A and a voltage sensor V, as well as to various drivers for driving the compressor 31, the main stop valve 43, the hydrogen pump 45, the exhaust/drain valve 47, the traction motor 54, etc.

The CPU receives detection results in the pressure sensor P, current sensor A and the voltage sensor V via the input-output interfaces, and processes the received detection results using various types of data in the RAM, in accordance with the control program stored in the ROM, thereby controlling the scavenging processing of the fuel cell system 1. The CPU outputs control signals to the various drivers via the input-output interfaces, thereby controlling the entire fuel cell system 1.

Figure 2:
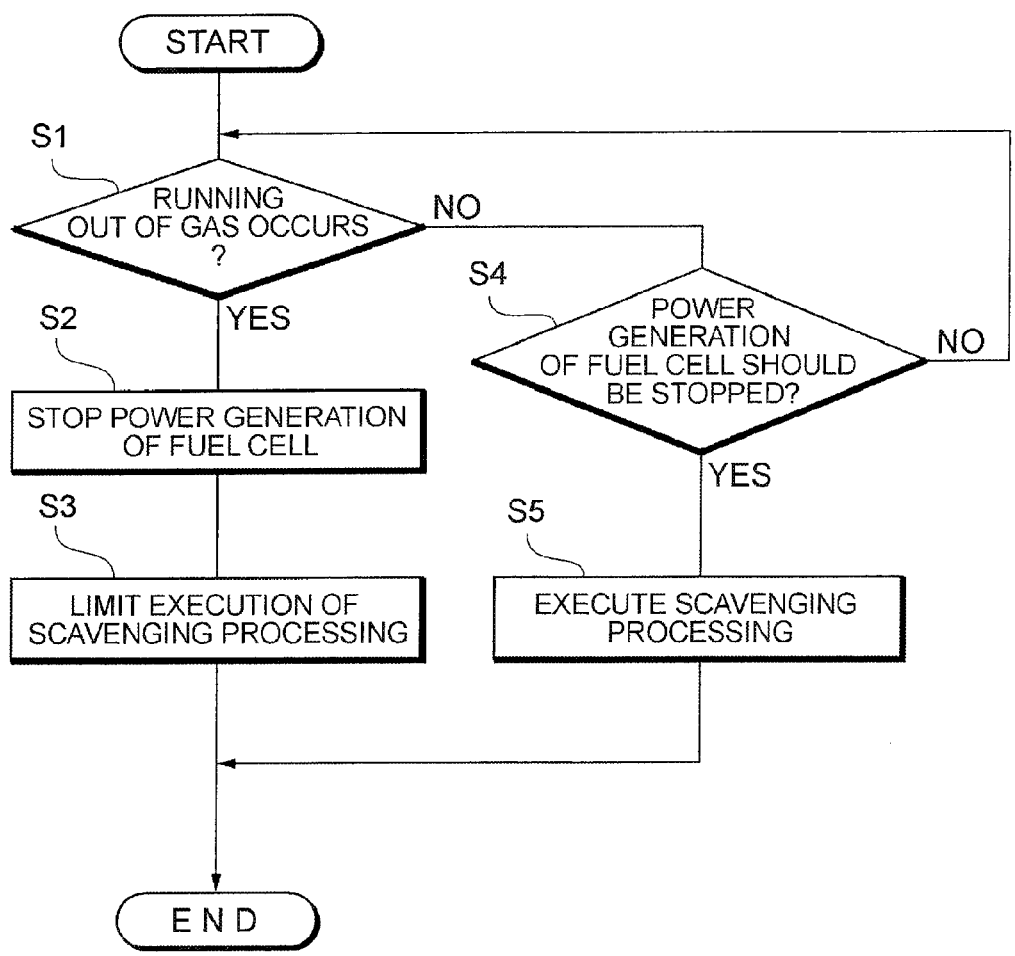
FIG. 2 is a flow chart explaining scavenging processing in the fuel cell system in the embodiment.

Next, the scavenging processing of the fuel cell system in the present embodiment will be described using the flowchart in FIG. 2.

First, the control unit 6 judges whether or not a sensor value in the pressure sensor P is equal to or smaller than the running-out-of-gas determination threshold value (step S1). In other words, the control unit 6 judges whether or not the condition of running out of gas occurs. If the judgment result is positive (step S1; YES), the control unit 6 stops the power generation of the fuel cell 2 (step S2). The control unit 6 then performs scavenging processing with, for example, the time required for the scavenging processing shortened (step S3).

On the other hand, when determining that the condition of running out of gas does not occur in step S1 (step S1; NO), the control unit 6 judges whether or not the power generation of the fuel cell 2 should be stopped (step S4). If the judgment result is negative (step S4; NO), the processing proceeds to step S1 above.

On the other hand, when determining that the power generation should be stopped in step S4 (step S4; YES), the control unit 6 stops the power generation and then performs normal scavenging processing (step S5).

As described above, in the fuel cell system 1 in the embodiment, in the situation where the power generation of the fuel cell 2 is stopped due to the occurrence of running out of gas, the execution of the scavenging processing can be limited, and thus a decrease in the electrical power stored in the secondary cell 52 can be suppressed. With such a configuration, even in the fuel cell system 1 which performs the scavenging processing after the power generation of the fuel cell is stopped, the travel distance by the EV drive can be increased.

Note that, although the above embodiment has described the occurrence of running out of gas as a criterion for limiting the execution of the scavenging processing, the criteria for limiting the execution of the scavenging processing are not limited thereto. The execution of the scavenging processing may be limited when an abnormal condition such as a failure occurs in any component contained in the fuel cell system 1.

Although each embodiment above has described the configuration in which the fuel cell system according to the present invention is provided in a fuel cell hybrid vehicle, the fuel cell system according to the present invention may be applied to various mobile objects (e.g., robots, ships and airplanes) other than fuel cell hybrid vehicles. In addition, the fuel cell system according to the present invention may also be applied to stationary power generation systems used as power generating equipment for structures (e.g., houses and buildings).

INDUSTRIAL APPLICABILITY

The fuel cell system according to the present invention is suitable for use in suppressing a decrease in electrical power in a battery.

What is claimed is:

1. A fuel cell system having a fuel cell which is supplied with a fuel gas and an oxidant gas and which generates electrical power through an electrochemical reaction between the fuel gas and the oxidant gas, the fuel cell system comprising:
   an air supply flow path which supplies the oxidant gas to the fuel cell;
   a hydrogen supply flow path which supplies the hydrogen gas to the fuel cell;
   a power storage unit which is charged with electric power generated by the fuel cell;
   a scavenging processing execution device being programmed to execute scavenging processing for removing remaining water in the fuel cell by discharging remaining water in the air supply flow path using the electrical power stored in the power storage unit after power generation of the fuel cell is stopped;
   a judgment device which judges whether or not a condition of running out of gas occurs in the fuel cell system;
   a control unit which stops the power generation of the fuel cell when the judgment device determines that the condition of running out of gas occurs; and
   a compressor which supplies the oxidant gas from the air supply flow path to the fuel cell,
   wherein the scavenging processing execution device is programmed to limit the execution of the scavenging processing after the power generation of the fuel cell is stopped only when the judgment device determines that the condition of running out of gas occurs, and
   the scavenging processing execution device is further programmed to execute the scavenging processing by supplying the oxidant gas through the air supply flow path from the compressor to the fuel cell, while limiting the execution of the scavenging processing by reducing an amount of supply of the oxidant gas supplied through the air supply flow path from the compressor.

2. The fuel cell system according to claim 1, wherein the scavenging processing execution device is programmed to limit execution of the scavenging processing by shortening time required for the scavenging processing.

3. The fuel cell system according to claim 1, wherein the scavenging processing execution device is programmed to limit execution of the scavenging processing by prohibiting the execution of the scavenging processing.

4. The fuel cell system according to claim 1, further comprising an air discharge flow path which discharges an oxidant-off gas discharged from the fuel cell.

* * * * *